C. BARDELONI.
DEVICE FOR RECEIVING RADIOTELEGRAPHIC AND RADIOTELEPHONIC SIGNALS.
APPLICATION FILED APR. 12, 1919.

1,381,692.

Patented June 14, 1921.

Inventor:
Cesare Bardeloni
per H. W. Plucker
Attorney.

UNITED STATES PATENT OFFICE.

CESARE BARDELONI, OF ROME, ITALY.

DEVICE FOR RECEIVING RADIOTELEGRAPHIC AND RADIOTELEPHONIC SIGNALS.

1,381,692.  Specification of Letters Patent.  Patented June 14, 1921.

Application filed April 12, 1919. Serial No. 289,758.

*To all whom it may concern:*

Be it known that I, CESARE BARDELONI, residing at Rome, in the Kingdom of Italy, have invented certain new and useful Improvements in Devices for Receiving Radiotelegraphic and Radiotelephonic Signals (for which I have filed application in Italy, October 3, 1916), of which the following is a full, clear, and exact description, which will enable others skilled in the art to which it appertains to make and use the same.

This invention relates to devices for receiving radiotelegraphic and radiotelephonic signals by means including ionized gas receivers having three electrodes and has for its object to provide improved means for amplifying the signal received. For said purpose an oscillating circuit under the influence of the arriving waves is connected on one side with the incandescent filament and on the other side with the grid of the valve, the third electrode of which is connected to the telephonic receiver, and a rectifying device is inserted across the connections of the oscillating circuit with the filament and the grid, so as to connect the said two elements of the valve; a potentiometer, in series with the rectifying contact being added in order to enable the operator to control and adjust at will the action of the device, as will be explained hereafter.

Figure 4:
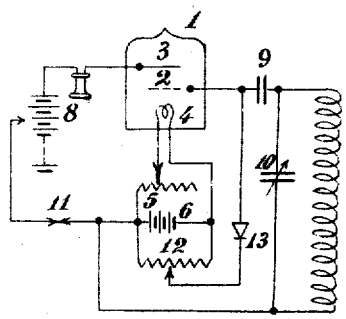
Fig. 4 is a diagram like that of Fig. 3, but with the potentiometer in series with the rectifying device and fed by the same source of electrical energy as the filament.
Figure 5:
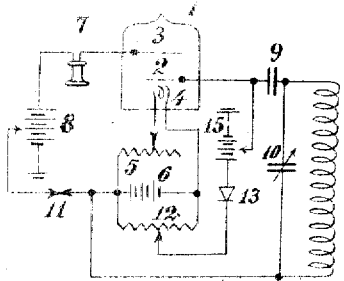

Fig. 5 is a diagram like that of Fig. 4, showing an adjustable E. M. F. placed in the circuit of the rectifying contact.

Figure 6:
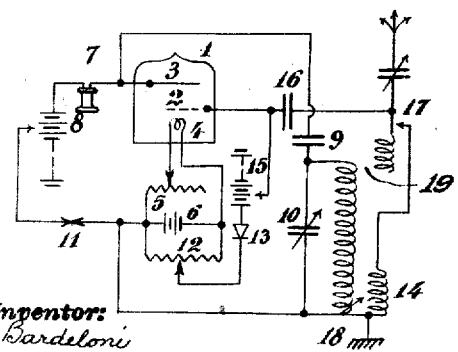

Fig. 6 is a diagram of a receiving plant showing the circuit of the aerial directly connected with the hot filament and the grid of the valve.

Figure 1:
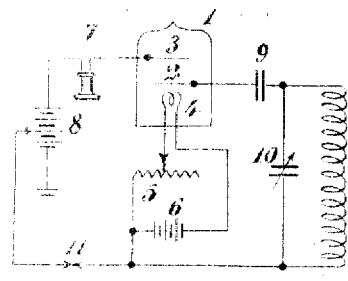
Figure 1 is a diagram showing the usual connections of the oscillating circuit to the ionized gas receiver.

As it is known, the above named receivers, for the reception of damped oscillations, are connected to an oscillating circuit in the manner schematically shown in Fig. 1 of the drawing where 1 is the ionized gas receiver containing the two electrodes 2 and 3 and a wire 4 rendered incandescent by the current that a suitable source 6 of electric energy supplies to it and which is regulated by means of a rheostat 5. To the electrode 3 is connected a telephone apparatus 7 which communicates with the positive pole of a suitable source of electric energy, the negative pole of which is in turn connected with the positive pole of the incandescent filament. The positive pole of the filament and the electrode 2 are connected in parallel with the oscillating circuit 10 and it is well known that it is advantageous to insert a condenser 9 between the electrode 2 and the aforesaid oscillating circuit. The telephone instead of at 7 may be evidently placed also at point 11 of the circuit. Of course the oscillating circuit 10 is suitably coupled with the receiving antenna.

Figure 2:
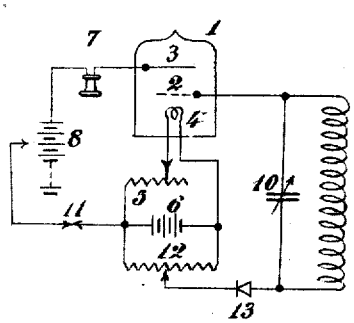
Fig. 2 is a diagram of a receiving plant like the above said comprising a rectifying device and potentiometer according to the invention.

When a scheme of the above mentioned kind is used, a remarkable amplification of the signals received is obtained, and also a high increase of sensitiveness of the receiver, by inserting a rectifier contact like, for instance, that between a steel plate and a carborundum crystal—in the manner illustrated in Fig. 2.

In Fig. 2, across the source 6 of the current feeding the filament is connected in the manner shown a potentiometer, the adjustable contact 12 of which is joined through the rectifying contact 13 suitably inserted, to one of the ends of the oscillating circuit, while the other end of said circuit goes directly to the electrode 2 without passing through the condenser 9, as shown in Fig. 1.

Figure 3:
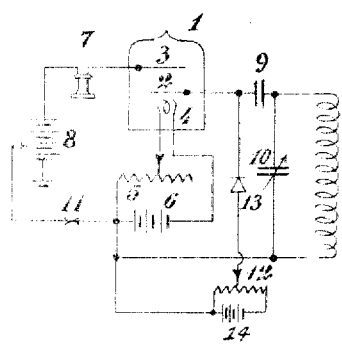
Fig. 3 is a diagram of a receiving plant like that shown in Fig. 2, but with the potentiometer in parallel with the rectifying device and fed by a different source of electrical energy from that which feeds the hot filament.

In Fig. 3 the potentiometer 12 is connected in series with the rectifying contact 13 and is provided with a current source 14 different from that feeding the filament. The positive poles of the two sources are however connected with each other. With such arrangement it is necessary to have a condenser 9 inserted between the point wherein the circuit of the rectifying contact reaches the electrode 2 and the oscillating circuit.

In Fig. 4 the oscillating circuit is connected with the ionized gas receiver as in the previous Figs. 1, 2 and 3 and the rectifying contact is placed on a circuit starting between the electrode 2 and the condenser 9 and ends at the resistance of the potentiometer 12 which is fed by the same source of electric energy which feeds the filament.

In Fig. 5, is shown the arrangement of an adjustable E. M. F. 15 placed in the circuit of the rectifying contact 13 in series with same and the sliding contact of the potentiometer 12 as in the foregoing case. It is obvious that such supplementary E. M. F. may be equally used also in the cases shown in Figs. 2, 3 and 6 or with other arrangements of circuits which, working on the principle of a rectifying device coöperating with an ionized gas receiver, may receive a different form from those above mentioned.

In Fig. 6 is shown the application of the invention to a form of circuit for the reception of persistent oscillations. In said figure the electrode 2 of the ionized gas receiver is connected at 17, through a condenser 16 having a suitable capacity, directly to the circuit of the antenna; the electrode 3 connected with the telephone 7 is also connected to the condenser 9 which, in the schemes of Figs. 1, 3, 4 and 5, is connected in parallel at one of the ends of the oscillating circuit 10, the other end of said oscillating circuit being connected to that of the antenna at 18 and the two oscillating circuits, circuit 10 and that of the antenna, are connected by means of the variable coupling 19.

The action of the rectifying contact, owing to its insertion with respect to the oscillating circuit with which it is connected in parallel and with respect to the electrode 2 of the ionized gas receiver, may be assumed to be a double one:

1st—that of actual amplification of the signals by the increase of positive charges which flow to the electrode 2 during the oscillations set up in the oscillating circuit;

2nd—that of unification of the ionized medium about the electrode 2, so as to neutralize, by means of negative charges reaching to the electrode through the contact, the excess of free positive charges due to the direct influence of the electrode 2, which latter thus follows only the charge variations which the aforesaid oscillating circuit impresses thereon.

Having thus described my invention what I claim is:

1. A device for detecting high frequency oscillations of the kind used for radiotelegraphic and radiotelephonic transmissions, comprising an oscillating circuit responsive to the action of the arriving waves, an ionized gas receiver with an incandescent filament, a grid and a third electrode, two conductors which, starting from the said oscillating circuit, lead respectively to the incandescent filament and to the grid, a rectifying device and a potentiometer inserted in series in a conductor bridging the said two conductors which end at the filament and the grid, the potentiometer being fed by the same source of electrical energy which feeds the incandescent filament, and a circuit comprising a telephonic or the like receiver connected to the third electrode.

2. A device for detecting high frequency oscillations of the kind used for radiotelegraphic and radiotelephonic transmissions comprising an oscillating circuit responsive to the action of the arriving waves, an ionized gas receiver with an incandescent filament, a grid and a third electrode, two conductors which starting from the said oscillating circuit lead respectively to the incandescent filament and to the grid, a rectifying device comprising a steel plate and a carborundum crystal, a potentiometer inserted in series with the rectifying device and a conductor bridging the said two conductors which end at the filament and at the grid, and a circuit comprising a telephonic or the like receiver, connected to the third electrode.

3. A device for detecting high frequency oscillations of the kind used for radiotelephonic and radiotelegraphic transmissions comprising an oscillating circuit on the aerial, responsive to the action of the arriving waves, an ionized gas receiver with an incandescent filament, a grid and a third electrode, two conductors which, starting from the said oscillating circuit, end respectively at the incandescent filament and at the grid, a source of electrical energy, a rectifying device and a potentiometer inserted in series in a conductor bridging the two said conductors which end at the filament and at the grid, a circuit comprising a telephone or like receiver and a source of E. M. F., said circuit being connected to the third electrode, and a closed oscillating circuit coupled with the oscillating circuit of the aerial and connected to the receiver on one side between the telephone and the third electrode, and on the other side between the source of electrical energy and the source of E. M. F. in the telephone receiver circuit.

In testimony whereof I affix my signature in the presence of two witnesses.

Signed at Rome, Italy, this 8th day of February, 1919.

CESARE BARDELONI

Witnesses:
LETTERIO LABRECIELLA,
RENATO SCEVOLA.